Oct. 13, 1970  G. BONNET ET AL  3,533,318
MACHINE TOOL FOR CUTTING AN ASSEMBLY OF COAXIAL TUBES
INTO PARTS, PARTICULARLY THE CHANNELS OF A
PRESSURE-TUBE NUCLEAR REACTOR
Filed Nov. 16, 1966  4 Sheets-Sheet 1

GEORGES BONNET,
LEARCO DI PIAZZA,
JEAN-MARIE JUNGER,
RENÉ S. LEROY,
GUIDO MOLLICA,
ERMELINO MONZANI,  INVENTORS.
BY

Robic and Bastien

ATTORNEYS.

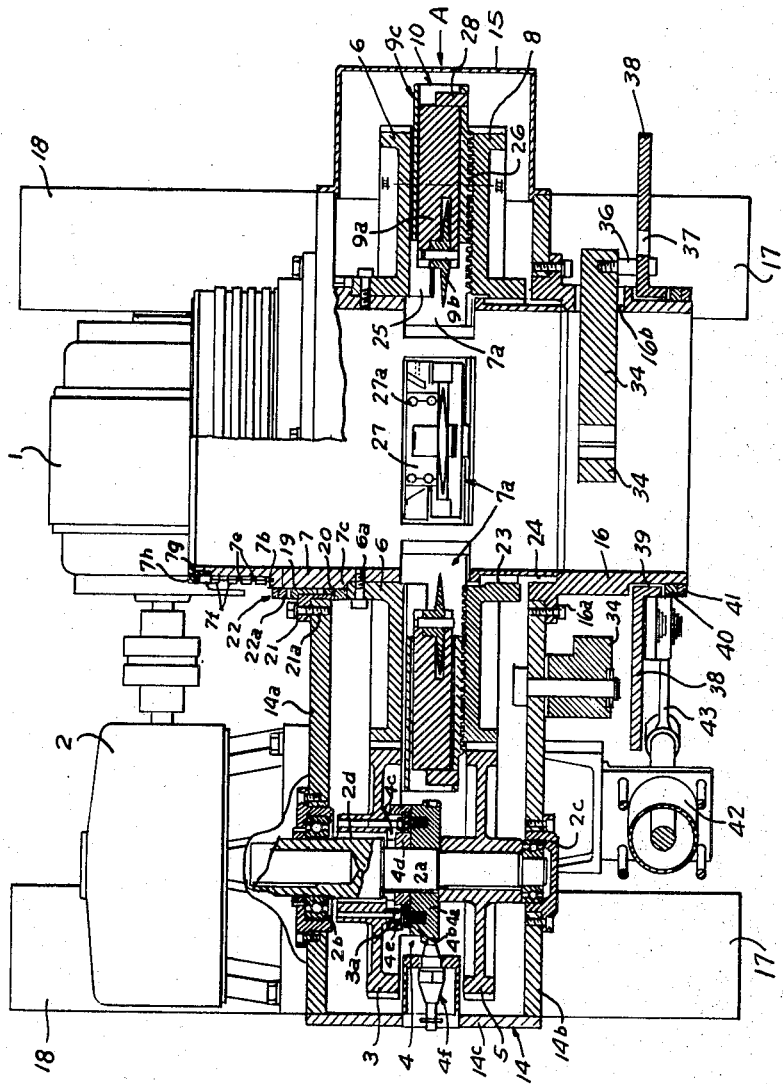

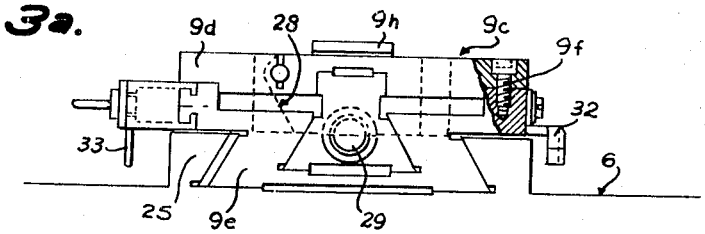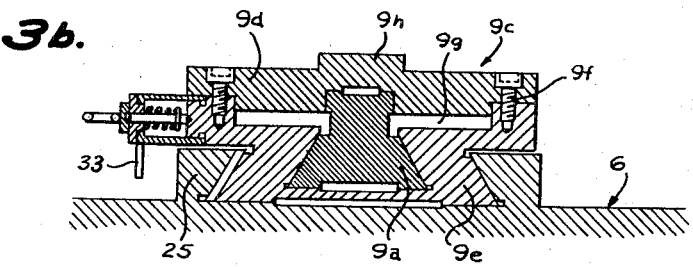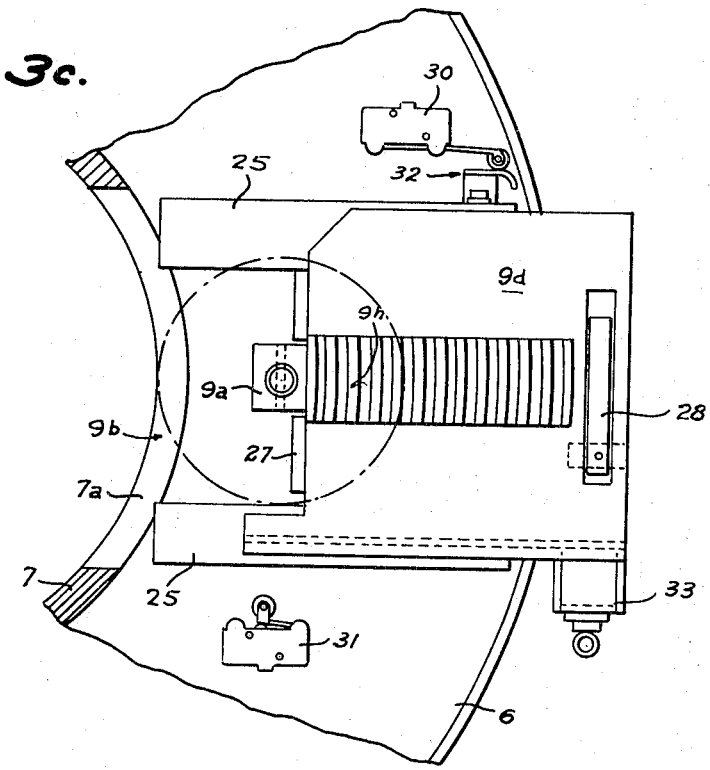

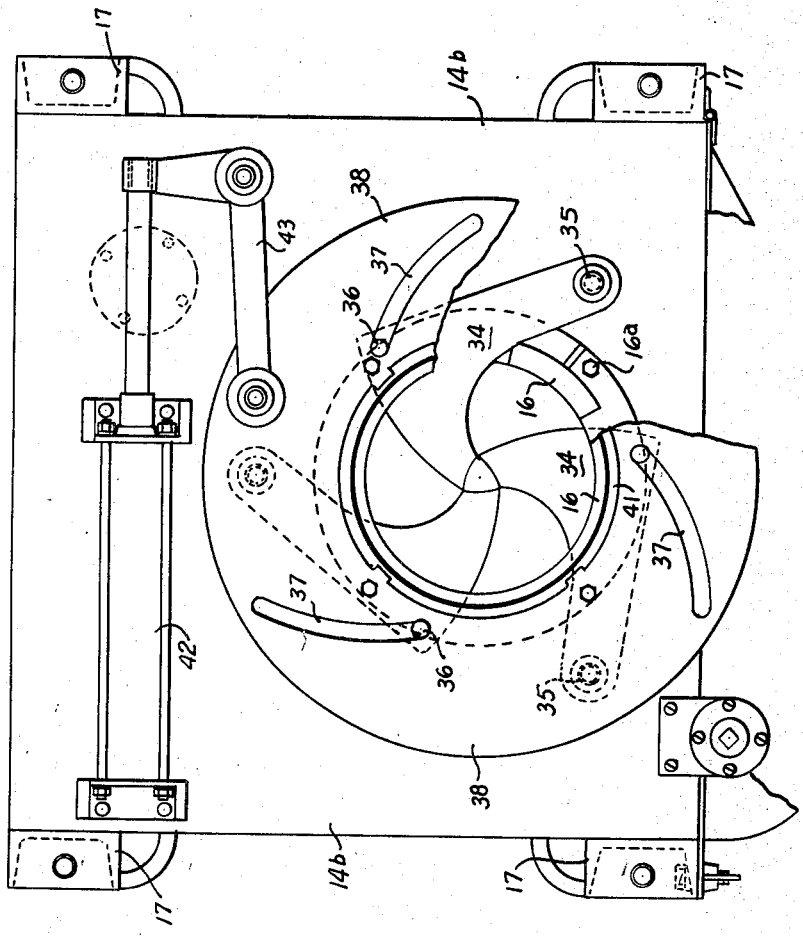

United States Patent Office 3,533,318
Patented Oct. 13, 1970

3,533,318
MACHINE TOOL FOR CUTTING AN ASSEMBLY OF COAXIAL TUBES INTO PARTS, PARTICULARLY THE CHANNELS OF A PRESSURE-TUBE NUCLEAR REACTOR
Georges L. Bonnet and Learco Di Piazza, Angera, Jean-Marie Junger, Leggiuno, Rene S. Leroy, Comerio, Guido Mollica, Varese, and Ermelino Monzani, Milan, Italy, assignors to European Atomic Energy Community (EURATOM), Brussels, Belgium
Filed Nov. 16, 1966, Ser. No. 594,848
Int. Cl. B23b 3/04, 5/14
U.S. Cl. 82—70.2
5 Claims

ABSTRACT OF THE DISCLOSURE

The invention relates to a tube cutting machine comprising a rotatable sleeve surrounding the axis of the tubes to be cut and coaxial therewith and cutting discs coupled to said sleeve for rotation therewith relative to the tubes. The sleeve has windows through which the discs project inwardly to engage the tubes.

---

The invention relates to a machine for use in cross-cutting tubes and provides improvements, in or modifications of, that forming the subject of specification Serial No. 447,717 dated Apr. 13, 1965 now issued to Pat., No. 3,385,148.

The principal improvement provided by the present invention relates to protection of the cutter discs from the work during loading and unloading. Other improvements provided by preferred features of the invention relate to means for feeding the cutter discs to the work and withdrawing them therefrom, to means for centering and clamping the work and to the manipulation of parts of the machine by remote operated handling means.

The invention provides a tube cutting machine as claimed in any one of the claims of specification No. 447,717 dated Apr. 13, 1965 in which there is a sleeve surrounding the axis of the tubes to be cut and coaxial therewith, the sleeve being coupled to the discs for rotation therewith relative to the tubes around said axis and having windows through which the discs project inwardly to engage the tubes.

In a preferred form of the invention the cutting discs are carried by supports located between two rotatable plates, the supports being carried on one plate for radial movement thereon and rotational movement thereby and having screw-threaded engagement with a scroll thread on the other plate whereby relative rotation between the plates effects radial movements of the supports and the sleeve being secured to the first plate for rotation therewith. The machine may have common drive means to said plates to effect rotation thereof simultaneously and a releasable clutch in the drive to said first plate whereby on release of the clutch radial movements of the supports may be effected by rotation of the said other plate independently of the first plate.

It is also preferred to incorporate limit switches controlling driving means for rotation of the plates and operable to stop such rotation when the supports reach inner or outer limits of radial movement.

A further preferred feature is the provision of means for centering and clamping tubes to be cut comprising a plurality of pivotally mounted clamping jaws and operating means therefor arranged to close the jaws towards the axis of the tubes in the manner of an iris diaphragm.

One particular mechanical arrangement of the present machine leads to a reversal of the actions of the rotating plates on the cutter-disc supports as compared with the machine disclosed in the parent specification. In the present machine, the cutter-disc supports are held in equidistant circular positions in radial grooves by the top rotating annular plate, whereas the bottom such plate produces the radial movement of the cutter discs through the agency of its scroll thread. Also, the plate drive system is adapted to the reversal of operations; the plate driving gear-wheels are mounted independently on a rotating shaft which is disposed parallel to the machine work space axis, and are coupled with a driving motor. The gear-wheel of the bottom rotating plate is secured to the shaft, but the gear-wheel of the top rotating plate is freely rotatable around the shaft but can be coupled therewith by an electromagnetic clutch which is interposed between the gear-wheels and is rigidly mounted on such shaft. The plate carrying the cutter-disc supports can therefore be disengaged from the driving means and not rotated with the scroll thread. The speed difference between the rotating plates is the result of a difference between the tooth numbers of the rotating plates and not, as in the parent machine, of the gear-wheels.

A more detailed description will now be given, by way of example, of a specific embodiment of the improved tube-cutting machine according to the invention, reference being made to the accompanying drawings in which:

FIG. 2 is a longitudinal section of the machine in its starting position;

FIG. 3a is a view, shown inverted, from the point A in FIG. 2, of the cutter disc support;

FIG. 3b is a section, inverted, on the line III—III of FIG. 2 through a cutter-disc support;

FIG. 3c is a plan view of the bottom surface of the cutter-disc support and corresponding part of the top rotating plate, and FIG. 4 is a view of the bottom surface of the machine shown in FIG. 2.

Figure 1:
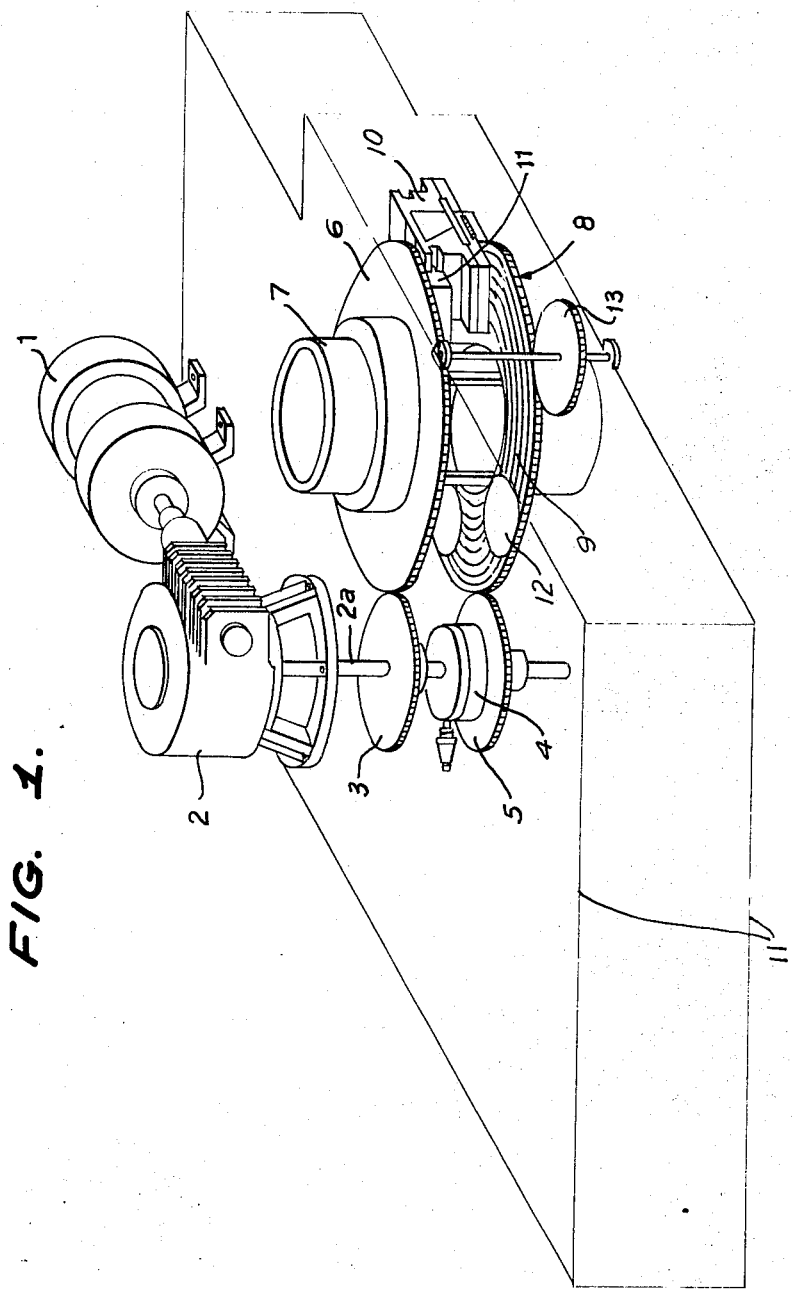
FIG. 1 is an overall schematic view in perspective of the units of the machine.

FIG. 1 shows the mechanical and kinetic construction of the improved cross-cutter. A three-phase electric motor 1 is coupled with a speed reducer (worm drive) 2 driving a top gear-wheel 3, electromagnetic clutch 4 and bottom gear-wheel 5 all mounted on a rotatable shaft 2a. Gear-wheel 3 meshes with a rotatable plate 6 secured to sleeve 7 forming the work space or cutting zone. Gear-wheel 5 meshes with a rotating plate 8 freely rotatable around sleeve 7. Plate 8 is formed with a scroll screw 9. Cutter-disc supports 10 have their top and bottom parts engaged with the plates 6, 8, the scroll screw 9 causing the supports 10 to slide radially in guides 11. Circles 12 represent the positions of the cutter discs (or the actual cutter discs themselves, in place). There are four circles 12, and therefore four cutter-disc supports 10, disposed diametrically on two axes which are perpendicular to one another and to the machine axis (i.e. the axis of the tubes being cut). Through the agency of a gear-wheel 13 which engages with the bottom rotating plate 8, the same can be rotated, if required, by the use of a handling device.

To give a more realistic impression of the machine, there are now quoted, by way of example, some details about its kinetics. The gear-wheels 3, 5 have eighty teeth, and the plates 6 and 8 have 199 and 200 teeth respectively. The pitch of the scroll is 7.25 mm. and the reducer output runs at 50 r.p.m. and the advance of the cutter-disc supports is therefore 0.036 mm./rev. or 0.72 mm./min. The same rate of advance can be used for all the materials to be cut. Experiments have been made with tubes varying from a minimum thickness of 0.6 mm. up to a maximum thickness of 6 mm. and made of the following materials: 304 stainless steel, ASTM 410 steel, 995 A aluminum, SAP (sintered aluminum powder) and Zircaloy 2.

Referring to FIG. 2 there can again be seen the electric motor 1, speed reducer 2, gear-wheels 3, 5 with clutch 4, rotating discs 6, 8, sleeve 7 and cutter-disc supports 10. As can also be seen in FIG. 1, the moving parts of the cross-cutter are placed in a casing 14 for protection. The casing 14 comprises the top plate 14a bottom plate 14b and side wall 14c. The projecting parts of the rotating discs are received in a side pocket 15 of the casing 14, a feature facilitating the introduction and withdrawal of the cutter-disc supports. Also, the top end of the sleeve 7 bounding the work space of the cross-cutter extends through the casing 14. The space is extended at the bottom by a cylinder 16.

The machine casing 14 has eight feet 17, 18—four at the top and four at the bottom—but only one pair of each reference is shown. The feet are secured to the casing top and bottom plate 14a, 14b, so that the machine can operate either in the position shown or the other way up.

A more detailed description will now be given of the machine parts which have been more particularly improved in accordance with the invention, viz, the work space, the cutter-disc supports, and the anchorage and centering system of the machine.

The work space is bounded by the sleeve 7 which is a tubular member about 20 cm. in diameter and 30 cm. in height. The wall of the sleeve is formed with four rectangular windows 7a at the level of the four cutting tools. The main function of the work space is to protect the cutter discs and the moving parts of the machine against the risk of damage by blows by, or contacts with, the tubes to be cross cut.

The sleeve 7 has shoulders 7b and 7c on its outer wall. The shoulder 7b serves as a bearing for a number of insulating rings 7e bearing conductive rings 7f. The rings are secured to the sleeve through the agency of a ring 7g and screws 7h. The conductive rings are connected to four control switch circuits (employing microswitches) disposed on the top rotating disc 6. The circuits control or supervise the travel of the cutter disc supports as will be described in greater detail hereinafter. At the level of the second shoulder (7c), the sleeve 7 serves as a seat for the rotating disc 6 which is secured to the sleeve 7 by use of screws 6a. Above this zone the sleeve 7 is centered and guided in the casing top plate through the agency of bronze rings 19, 20 which are spaced apart from one another by a flange 21 and a bearing ring 22. These elements together form the top friction bearing of the sleeve. The flange 21 is secured to the casing top plate by screws 21a. The ring 22 is screwed to the sleeve 7 by screws 22a. The bottom part of the sleeve is received in two bronze rings 23, 24 which also form an antifriction bearing for the rotating disc 8. The extension cylinder 16 which extends the sleeve downwards is secured to the casing bottom plate by screws 16a.

Each of the improved cutter-disc supports according to the invention mainly comprises two members—a tool holder 9a with a cutter disc 9b, and a case 9c for the tool holder 9a. Not only can the complete cutter-disc support be removed from the machine, but the tool holders 9a can also be removed independently of the complete supports, to facilitate locating the cutter discs when they are changed. The cutter disc supports follow intimately the shape of the radial guides 25 at the top plate and of the scroll screw 26 of the bottom plate and can be disengaged from the plates by rotation of the scroll screw plate in the direction to move the support outwardly.

As can be seen more clearly in FIGS. 3a and 3b, the case 9c is in two parts—a cover 9d and a slide 9e. The cover 9d is secured to the slide edges by screws 9f to bound a free space 9g within which the cutter disc can be received. The cover 9d has teeth 9h which mesh with the scroll screw of the rotatable plate 8. The guides for the cutter-disc supports take the form of bevelled ribs 25 of the rotatable plate, forming a dovetail. Each slide is also formed with a dovetailed groove in which the tool holder 9a is received after the fashion of a tongue. Radial movement of the tool holder 9a is limited by two abutments. The front abutment takes the form of a plate 27 (see FIG. 2) which is secured to the case 9c by four screws 27a, and the rear abutment takes the form of a movable stop 28 (see FIGS. 2 and 3a). The cutting reaction of the cutter disc is taken by the stop 28 which is maintained horizontal by an appropriate shoulder. To enable a tool holder 9a to be replaced by another with the use of handling devices, the rear part of the tool holder is formed with a tapped aperture 29, as can be seen in FIG. 3 where the aperture is partly hidden by the stop 28. In the case of a tool which is secured to the tool holder by screwing, the tool holder can be withdrawn from its reception area by a handling device once the stop 28 has been removed.

As can be seen in FIG. 3c, the travel of the cutter-disc supports is supervised by two electric switches 30, 31 actuated by fingers 32, 33 (see also FIG. 3a). The finger or abutment 32 is movable and can be adjusted along the cutter-disc support in accordance with the diameter of the tube being cut. The switches switch off the motor when the cutter-disc supports reach the end of their predetermined travel.

A description will now be given of the third improvement in the machine—i.e. the self-centering tube clamping means disposed below the machine in the extension cylinder 16. As can be seen in FIGS. 2 and 4, a mechanism similar to a photographic iris diaphragm is disposed at the exit (or, if required, the entry) of the machine work space. There are three identical lever jaws 34, arranged for pivotal movement around screwed fasteners 35 on the machine casing bottom plate and extending through slots 16b in the cylinder 16. Pins 36 of the clamps engage in curved slots 37 in a control disc 38 freely rotatable around the cylinder 16. As can be seen in FIG. 2, the disc 38 rotates around the bearing ring 39 and is kept in position by screw-threaded rings 40, 41 screwed to the cylinder 16. As can be seen in FIG. 4, a double-acting compressed-air ram 42 secured to the machine bottom plate rotates the disc 38 via a rod 43. When the ram causes the disc 38 to rotate, the jaws close centering and clamping the tube to be cut or open to release the tube. The clamping pressure is adjustable. Jaw teeth matching the shape of the tube to be retained can be placed on the jaws. When the machine works suspended on a cable, the clamping effect of the jaws automatically centres the machine on the tube to be cut.

The description of the machine will now be completed by the description of the system for driving the rotatable plates. As can be seen in the left-hand part of FIG. 2, the speed reducer 2 is coupled with the rotating shaft 2a, which is received in the machine casing with the interposition of ball bearings 2b, 2c. Gear-wheel 5 and the driving part 4a of the electromagnetic clutch 4, which is of the EZE "Destron" Stromag type, are secured to the shaft. Opposite the driving part 4a the gear-wheel 3 is mounted freely around the bronze ring 2d which rests on the rings 4c, 4d supported by the driving part 4a of the clutch. The gear-wheel 3 engages with the driven part 4b of the clutch with the interposition of a toothed ring 3a engaging freely the toothing 4e of the driven part 4b of the clutch. When the clutch engages it couples the gear-wheel 3 to the driving means. The clutch winding is energized via a brush 4f.

The cross-cutter machine has been specially devised for operation in irradiated zones or on radioacive materials. When used outside cells the machine is also provided with lead screening on which the reactor transfer hood is placed.

We claim:

1. A tube cutting machine for sectioning tubes comprising a rotatable sleeve surrounding the axis of the tubes to be cut and coaxial therewith; cutting discs coupled to said sleeve for rotation therewith relative to the tubes, said sleeve having windows through which the discs project inwardly to engage the tubes; a first and a second rotatable plate mounted on said sleeve; drive means for effecting relative rotation of the plates; supports for said discs located between said rotatable plates, said supports being carried on the first plate for radial movement thereon and rotational movement thereby and having a screw-threaded engagement with the second plate whereby relative rotation between the plates effects radial movements of the supports, said first plate being secured to the sleeve for rotation therewith.

2. A tube cutting machine as claimed in claim 1 having common drive means to said plates to effect rotation thereof simultaneously and a releasable clutch in the drive of said first plate whereby on release of the clutch radial movements of the supports may be effected by rotation of the said second plate independently of the first plate.

3. A tube cutting machine as claimed in claim 1 incorporating limit switches controlling said drive means for rotation of the plates and operable to stop such rotation when the supports reach inner or outer limits of radial movement.

4. A tube cutting machine as claimed in claim 1 having means for centering and clamping tubes to be cut comprising a plurality of pivotally mounted clamping jaws and operating means therefor arranged to close the jaws towards the axis of the tubes in the manner of an iris diaphragm.

5. A tube cutting machine as claimed in claim 1, wherein said supports include tool holders for holding the cutter discs, said tool holders being removable to replace the cutter discs.

References Cited
UNITED STATES PATENTS

| 782,462 | 2/1905 | Parker | 82—70.2 |
| 1,664,807 | 4/1928 | Cole | 82—70.2 |
| 2,239,755 | 4/1941 | Montgomery | 82—70.2 X |

HARRISON L. HINSON, Primary Examiner

U.S. Cl. X.R.

82—101